Patented June 25, 1935

2,006,198

UNITED STATES PATENT OFFICE 2,006,198

METHOD OF PREPARING HALOGENATED KETONES

Per K. Frolich and Peter J. Wiezevich, Elizabeth, N. J., assignors to Standard Oil Development Company, a corporation of Delaware No Drawing. Application June 23, 1931, Serial No. 546,428

8 Claims. (Cl. 260—134)

This invention relates to improvements in the preparation and use of halogenated ketones and their derivatives.

With a preferred embodiment in mind, but without intention to limit the invention more than is required by the prior art, an organic acid halide and an olefine are reacted at a moderate temperature with or without the presence of a suitable catalyst for the reaction preferably under pressures above atmospheric pressure. The acid halides used are the halides of such acids as acetic, propionic, oxalic, butyric acid or the like. The halides include the chlorides, bromides and iodides. For example, acetyl chloride or a halogenated acid chloride such as chloracetyl chloride can be used. The olefines include ethylene, propylene, butylene, amylene and the like. The reaction may be carried out in the presence of such a non-alkaline condensing catalyst as charcoal, pumice, hydrogen halide, or a metallic halide such as bismuth chloride, copper chloride, aluminum chloride, or the like. The pressures employed by carrying out the reaction are preferably above atmospheric generally in the range from approximately 20 to 200 atmospheres. The reaction is carried out at such moderate temperatures as approximately 100° to 300° C., and may, if desired, be carried out in the presence of an inert liquid solvent.

By way of example, acetyl chloride is mixed with ethylene and the mixture is heated in the presence of charcoal at approximately 100° C. under a pressure of approximately 50 atmospheres. As a result chlorethyl-methyl-ketone is formed.

The ketones thus formed may be used as solvents without other treatment or may first be hydrolyzed to give the corresponding hydroxy derivatives.

Various changes may be made within the scope of the appended claims in which it is desired to claim all novelty inherent in the invention as broadly as the prior art permits.

We claim:

1. The process of preparing halogenated ketones which comprises mixing an aliphatic acid halide and an olefine, and heating the mixture to at least approximately 100° C.

2. The process according to claim 1 in which a non-alkaline condensing catalyst is employed.

3. The process according to claim 1 in which a pressure of approximately 20 to 200 atmospheres is employed.

4. The process according to claim 1 in which an inert liquid solvent is used.

5. Process according to claim 1 in which the olefine used is a straight chain aliphatic olefine.

6. The process of preparing halogenated ketones, which comprises mixing acetyl chloride and an olefine, and heating the mixture in the presence of a non-alkaline condensing catalyst for the reaction to approximately 100° to 300° C. under a pressure of approximately 20 to 200 atmospheres.

7. The process of preparing halogenated ketones, which comprises mixing acetyl chloride and ethylene, and heating the mixture in the presence of a non-alkaline condensing catalyst for the reaction of approximately 100° to 300° C. under a pressure greater than atmospheric.

8. The process of preparing halogenated ketones, which comprises mixing acetyl chloride and ethylene, and heating the mixture in the presence of charcoal to approximately 100° to 300° C. under a pressure greater than atmospheric.

PER K. FROLICH.
PETER J. WIEZEVICH.